July 31, 1951  H. V. LEA  2,562,674
PLOW ASSEMBLY FOR BEET HARVESTERS
Filed Nov. 23, 1946  3 Sheets-Sheet 1

INVENTOR.
Henry V. Lea
BY
ATTYS

July 31, 1951   H. V. LEA   2,562,674
PLOW ASSEMBLY FOR BEET HARVESTERS
Filed Nov. 23, 1946   3 Sheets-Sheet 2

INVENTOR.
Henry V. Lea
BY
ATTYS

July 31, 1951 — H. V. LEA — 2,562,674
PLOW ASSEMBLY FOR BEET HARVESTERS
Filed Nov. 23, 1946 — 3 Sheets-Sheet 3
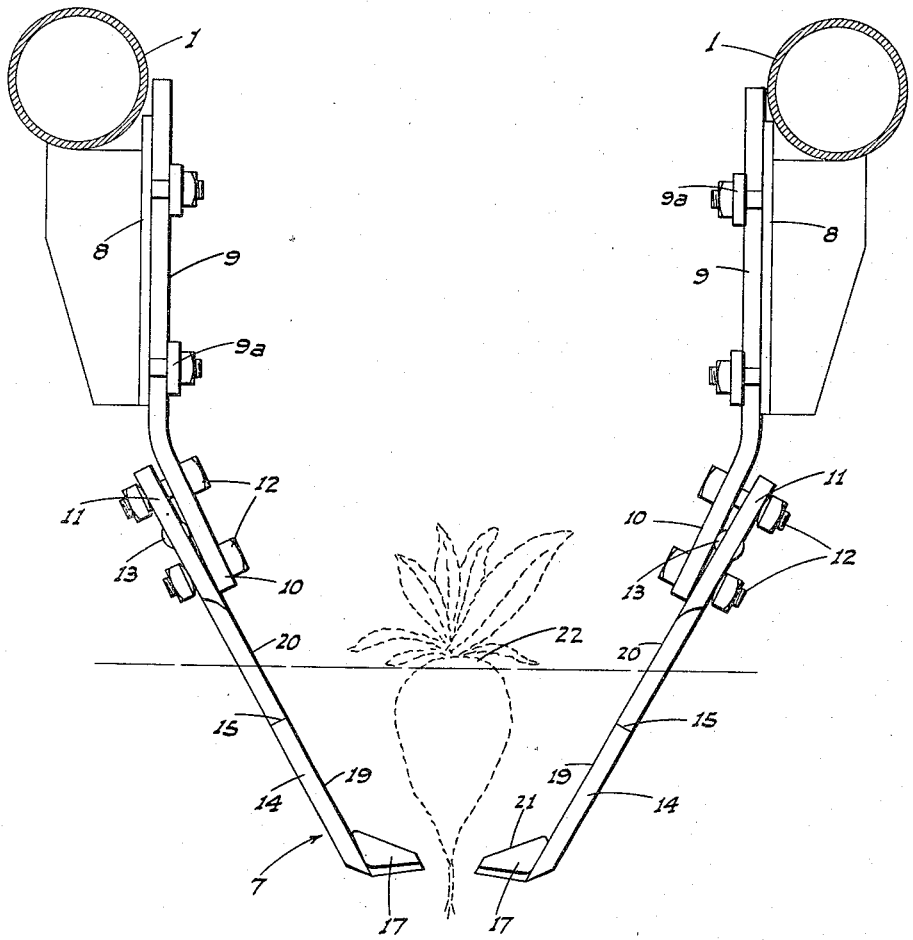
Fig. 3
Fig. 5
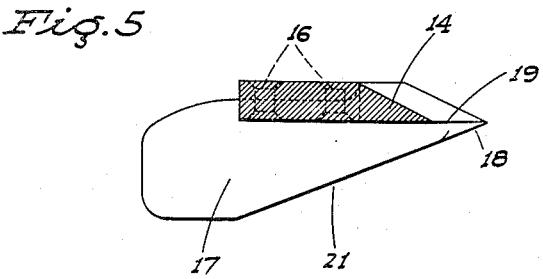
INVENTOR.
Henry V. Lea
BY
ATTYS Patented July 31, 1951

2,562,674

UNITED STATES PATENT OFFICE 2,562,674

PLOW ASSEMBLY FOR BEET HARVESTERS

Henry V. Léa, Rio Vista, Calif., assignor of twenty-one and one-fourth per cent to Claude A. Loucks, thirty-six and one-fourth per cent to Lloyd K. Schmidt, twenty-one and one-fourth per cent to Albert M. Jongeneel, and twenty-one and one-fourth per cent to George P. du Bose Application November 23, 1946, Serial No. 711,865

7 Claims. (Cl. 55—108)

1

This invention is directed to an improved plow assembly for beet harvesters, and in particular represents modifications of the plow assembly shown in U. S. Patent No. 2,377,347, dated June 5, 1945.

As shown in the identified patent, the plow assembly comprises plow units leading and trailing relative to the point of ground contact of the spiked, beet pick-up wheel which the harvester includes.

One object of this invention is to provide a plow assembly for beet harvesters, which includes plow units designed to work close to the beets as is desirable, and to disturb the soil about the beets to a depth extending about the tap roots; both whereby the beets are effectively loosened for lifting by the spiked wheel. As in Patent No. 2,377,347, the leading and trailing plow units serve, respectively, to accomplish initial loosening ahead of the point of ground contact of the wheel, and to further loosen, and lift the beets slightly to the rear of said point, upon said beets being impaled on the wheel.

Another object of this invention is to provide a plow assembly designed to reduce the draft required to advance the same through the ground.

An additional object is to provide novel adjustable mounts for each plow unit whereby the suction angle, running depth, and lateral position, are selectively variable as working conditions may require.

It is also an object to provide a plow assembly, for the purpose described, which includes a transversely spaced pair of leading plow units, and a transversely spaced pair of trailing plow units; the units being adjusted for the passage of the beets therebetween, the trailing plow units preferably running to a greater depth than the leading plow units.

A further object of the invention is to provide a practical plow assembly, and yet one which will be exceedingly effective for the purpose for which it is designed.

These objects are accomplished by means of such structure and relative arrangement of parts as will fully appear by a perusal of the following specification and claims.

In the drawings:

Fig. 3 is a front elevation of the pair of transversely spaced trailing plow units.

2

Figure 4:
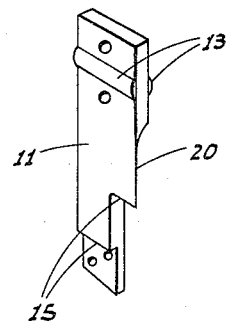

Fig. 4 is a perspective view, detached, of the upper section of one of the plow standards.

Fig. 5 is a sectional plan view, taken through the standard, of one of the plow units.

Referring now more particularly to the characters of reference on the drawings, the plow assembly which embodies the present invention is arranged in connection with a beet harvester having a vertically floating frame including side beams 1 disposed in transversely spaced relation and carrying a cross shaft 2 on which a relatively large-diameter, spiked, beet pick-up wheel 3 is mounted. The beet pick-up wheel 3 includes a wide faced rim 4 having a multiplicity of outwardly projecting beet pick-up spikes 5 fixed thereon. The wheel 3 runs substantially centrally between, and in spaced relation to, the side beams 1.

The plow assembly includes, generally, a pair of transversely spaced leading sub-soil plow units 6 suspended from the side beams 1 and running some distance ahead of the point of ground contact of the wheel 3.

The assembly also includes a pair of transversely spaced trailing sub-soil plow units, indicated generally at 7, which units run in the ground closely adjacent but to the rear of said point of contact of the wheel with the ground; said trailing plow units 7 likewise being suspended from corresponding ones of the side beams 1.

As the plow units 6 and 7 are each of substantially the same structural arrangement and mounting, a description by reference to one of said units will suffice for all.

Each of the plow units is constructed and mounted as follows:

A rigid attachment plate 8 is fixed on and projects downwardly from the corresponding side beam 1, and a flat leg 9 is secured to and depends from such attachment plate 8; the securing means 9a being arranged to permit of selective adjustment of such leg 9 vertically or horizontally.

The lower end portion of the leg 9 is formed as a downwardly and inwardly inclined part 10 of flat, laterally facing configuration which terminates clear of the ground.

Each plow unit includes a flat, heavy-duty standard 11 adapted to lap the inclined part 10 of the leg 9 on the inside or outside, depending upon the desired spacing of the plow units. The standards 11 of the plow units 6 are here shown as engaged with adjacent faces of the inclined parts 10 of the legs 9, while the standards 11 of the trailing plow units 7 are engaged with the outsides of said inclined parts 10, whereby to provide of slightly greater spacing of the plows.

Each standard 11 is connected to the corresponding inclined part 10 by a pair of vertically spaced securing bolts 12, and between the bolt holes the standard is formed, on opposite faces, with a transverse fulcrum rib 13, one of said ribs bearing against the adjacent inclined part 10; the fulcrum rib which so bears depending of course on whether the standard is inside or outside the inclined part 10. By providing this fulcrum rib arrangement it will be seen that the bolts 12 can be adjusted so as to throw the lower end of the standard 11 laterally inwardly or outwardly. This is for the purpose of nicety of adjustment of the spacing between the plows, as hereinafter described, which are carried on the lower ends of the standards 11.

The lower end portion of each standard 11 is formed as a removable, staged shank 14, including staged abutments 15 which maintain said shank in proper alinement with the remainder of the standard 11; the shank 14 being affixed to the remainder of the standard by cross bolts 16.

At its lower end the shank 14 is affixed to a longitudinal plow share 17 along the outer edge thereof, and with said shank parallel to the longitudinal plane of movement of the implement.

The forward portion of the shank 14, at its lower end, merges into the plow point 18, and the leading edge of the shank is sharpened to form a cutting edge 19, which cutting edge extends upwardly into the standard 11, as at 20.

The laterally inner edge 21 of the plow share 17 is diagonal in a direction to converge inwardly and rearwardly relative to the direction of travel.

Figure 1:
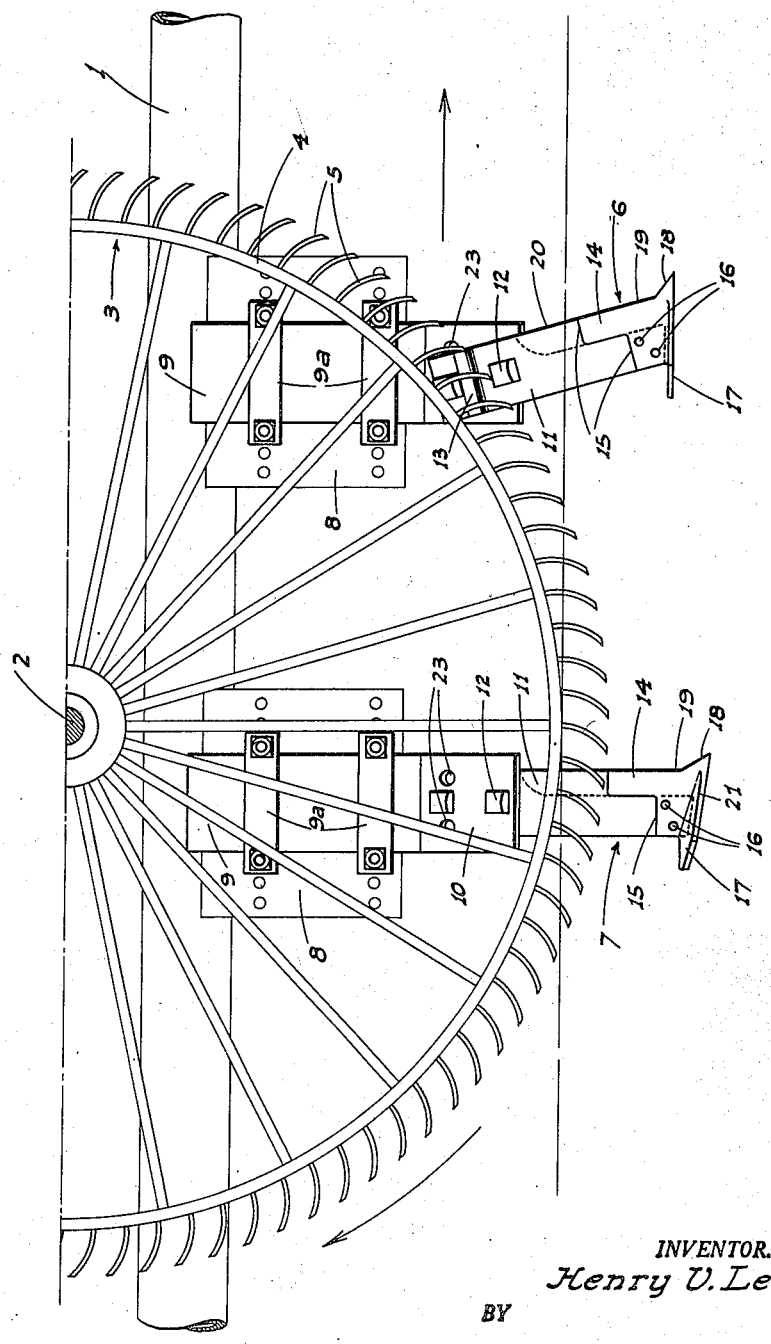
Fig. 1 is a side elevation of the plow assembly as applied to a beet harvester in cooperative relation to the spiked, beet pick-up wheel.
Figure 2:
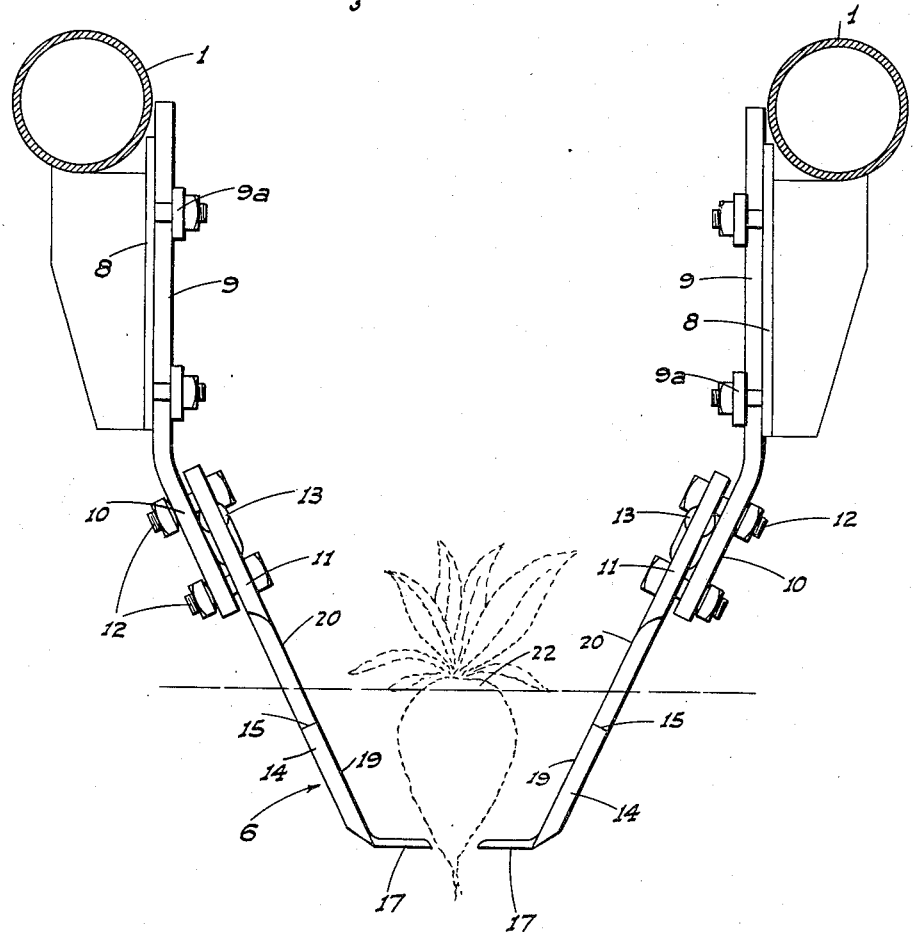
Fig. 2 is a front elevation of the pair of transversely spaced leading plow units.

The leading pair of plow units 6 is normally disposed to run at a depth somewhat lesser than the path of trailing plow units 7. The purpose of this setting is so that the leading plow units 6, which pass closely on opposite sides of the beets 22 (see Fig. 2) accomplish an initial loosening of the soil closely about the body of the beets. The trailing plow units 7 accomplish a further and deeper loosening of the soil, as shown in Fig. 3, to a depth which extends about the tap roots of the beets 22; such loosening being accomplished at substantially the time that the beets are impaled upon the spikes 5 of the pickup wheel 3. With continued rotation of such wheel in the direction indicated, the trailing plow units 7 serve a further purpose of urging the impaled beets upwardly, facilitating their removal from the ground by the said spiked beet pick-up wheel.

Depending upon soil or other working conditions it may be desirable to alter the suction angle of the plow shares 17, and this is made possible by reason of a row of longitudinally spaced holes 23 in the inclined part 10 of each leg, so that the uppermost bolt 12 may be inserted, selectively, in any one of said holes 23. In this manner each standard 11 may be adjusted to vary the suction angle of the plow share 17.

Under certain working conditions it has been found desirable, as shown in the drawings, for the plow shares 17 of the leading plow units to run substantially horizontal, with the plow share 17 of the trailing plow units 7 inclined forwardly and rearwardly to assure of adequate lift on the beets at the moment of their withdrawal from the ground by the spiked pick-up wheel 3.

By providing the leading and trailing plow units in pairs in transversely spaced relation for the passage of the beets therebetween, and arranging such plow units for selective adjustment of their suction angle, running depth, and lateral position, the plow assembly is adaptable for use in many different types of soil and crop conditions.

As the standards 11 of each pair of the plow units extend in upwardly diverging relation, and as the forward edges of such standards 11 are sharpened to provide cutting edges, entanglement of the plow units with the beet tops, weeds, etc., is minimized; such cutting edges tending to cut through and prevent trailing of enmeshed weeds, etc. from the plow units.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described the invention the following is claimed as new and useful and upon which Letters Patent are desired:

1. In a beet harvester a spiked, beet pick-up wheel adapted to ride on a beet row with advance of the harvester, and a plow assembly comprising a leading pair of transversely spaced sub-soil plow units supported ahead of the point of contact of the wheel with the ground, and a trailing pair of transversely spaced sub-soil plow units supported rearwardly of said point; the plow units of each pair being disposed to pass adjacent and on opposite sides of the beets in the row.

2. In a beet harvester a spiked, beet pick-up wheel adapted to ride on a beet row with advance of the harvester, and a plow assembly comprising a leading pair of transversely spaced sub-soil plow units supported ahead of the point of contact of the wheel with the ground, and a trailing pair of transversely spaced sub-soil plow units supported rearwardly of said point; the plow units of each pair being disposed to pass adjacent and on opposite sides of the beets in the row; and the leading plow units running at a lesser depth than the trailing plow units.

3. In a beet harvester a spiked, beet pick-up wheel adapted to ride on a beet row with advance of the harvester, and a plow assembly comprising a leading pair of transversely spaced sub-soil plow units supported ahead of the point of contact of the wheel with the ground, and a trailing pair of transversely spaced sub-soil plow units supported rearwardly of said point; the plow units of each pair including shanks having a front cutting edge extending some distance above ground.

4. In a beet harvester a spiked, beet pick-up wheel adapted to ride on a beet row with advance of the harvester, and a plow assembly comprising a leading pair of transversely spaced sub-soil plow units supported ahead of the point of contact of the wheel with the ground, and a trailing pair of transversely spaced sub-soil plow units supported rearwardly of said point; the plow units of each pair being disposed to pass adjacent and on opposite sides of the beets in the row; the leading plow units running at a lesser depth than the trailing plow units and the latter having a greater suction angle than said leading plow units.

5. In a beet harvester a spiked, beet pick-up wheel adapted to ride on a beet row with advance of the harvester, and a plow assembly comprising a pair of transversely spaced legs mounted on the harvester and depending on opposite sides of the longitudinal vertical plane of the pick-up wheel, a pair of standards having plow shares on their lower ends, said legs being flat lengthwise of the harvester and the shanks at their upper end overlapping the legs at their lower end, and means mounting the overlapping portions of corresponding standards and legs together for adjustment of the standards laterally of the direction of travel; said means comprising a pair of vertically spaced axially adjustable bolts connecting the leg and standard, and a transverse element on and projecting from the inner face of the standard between the bolts and engaging the leg to form a fulcrum about which the standard may rock upon adjustment of the bolts in opposite directions.

6. In a beet harvester a spiked, beet pick-up wheel adapted to ride on a beet row with advance of the harvester, and a plow assembly comprising a pair of transversely spaced legs mounted on the harvester and depending on opposite sides of the longitudinal vertical plane of the pick-up wheel, a pair of standards having plow shares on their lower ends, said legs being flat lengthwise of the harvester and the shanks at their upper end overlapping the legs at their lower end, and means mounting the overlapping portions of corresponding standards and legs together for adjustment of the standards to alter the suction angle of the corresponding plows; said means comprising a pivot member connecting the standard and leg, said leg having a plurality of bolt holes disposed in a row concentric with the pivot member, and a bolt in the standard removably projecting through any selected one of said holes.

7. In combination with a mobile frame and a spiked pick-up wheel mounted for rotation in said frame and operative to ride the ground; a plow assembly, such assembly comprising a leading pair of transversely spaced sub-soil plow units supported on and depending from the frame at a point forwardly of the point of contact of the wheel with the ground, a trailing pair of transversely spaced sub-soil plow units supported on and depending from the frame at a point immediately to the rear of the point of contact of the wheel with the ground, both such assemblies being set at such a depth relative to the wheel that the plows of each will move through the ground at a point relatively close to and on opposite sides of the beets in the ground and above the tap roots of such beets, the leading plows being set at a higher level relative to the frame than the trailing plows.

HENRY V. LÉA.

REFERENCES CITED

The following references are of record in the file of this patent:

UNITED STATES PATENTS

| Number | Name | Date |
|---|---|---|
| 714,518 | Pruvot | Nov. 25, 1902 |
| 829,286 | Palmer | Aug. 21, 1906 |
| 893,311 | Davis | July 14, 1908 |
| 1,077,978 | Haster | Nov. 11, 1913 |
| 1,288,300 | Van Beek | Dec. 17, 1918 |
| 1,514,782 | Nobles et al. | Nov. 11, 1924 |
| 1,517,942 | Bishop | Dec. 2, 1924 |
| 2,336,623 | Loucks et al. | Dec. 14, 1943 |
| 2,350,173 | Loucks et al. | May 30, 1944 |
| 2,377,347 | Lea et al. | June 5, 1945 |
| 2,399,818 | Michael | May 7, 1946 |
| 2,405,205 | Gordon et al. | Aug. 6, 1946 |
| 2,430,434 | Rutter | Nov. 4, 1947 |